US012665630B2

(12) United States Patent
Xhafa et al.

(10) Patent No.: US 12,665,630 B2
(45) Date of Patent: *Jun. 23, 2026

(54) INDEPENDENT SEQUENCE PROCESSING TO FACILITATE SECURITY BETWEEN NODES IN WIRELESS NETWORKS

(71) Applicant: TEXAS INSTRUMENTS INCORPORATED, Dallas, TX (US)

(72) Inventors: Ariton E. Xhafa, Plano, TX (US); Xiaolin Lu, Allen, TX (US); Janwei Zhou, Plano, TX (US); Il Han Kim, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,423

(22) Filed: May 28, 2024

(65) Prior Publication Data

US 2024/0313823 A1      Sep. 19, 2024

Related U.S. Application Data

(63) Continuation of application No. 17/952,551, filed on Sep. 26, 2022, now Pat. No. 12,034,473, which is a
(Continued)

(51) Int. Cl.
*H04B 1/00*      (2006.01)
*H04B 1/7156*      (2011.01)
(Continued)

(52) U.S. Cl.
CPC ......... *H04B 1/7156* (2013.01); *H04L 9/0631* (2013.01); *H04L 63/0442* (2013.01);
(Continued)

(58) Field of Classification Search
CPC .... H04B 1/713; H04B 1/7156; H04B 1/7143; H04L 9/0637; H04L 9/0825; H04W 12/0471; H04W 72/0453; H04W 84/418
(Continued)

(56) References Cited

U.S. PATENT DOCUMENTS 6,253,321 B1      6/2001   Nikander
7,529,943 B1      5/2009   Beser
(Continued)

FOREIGN PATENT DOCUMENTS

JP      2014016749 A      1/2014

OTHER PUBLICATIONS

Institute of electrical and electronics engineers Std. 802.15, 4e-2012; Year 2012.
(Continued)

*Primary Examiner* — Khai Tran
(74) *Attorney, Agent, or Firm* — Michelle F. Murray; Frank D. Cimino

(57)      ABSTRACT

A network includes a first wireless node that communicates over a wireless network connection. The first wireless node includes a first encryption engine that processes a first initialization data set and a current transmit sequence associated with a current communication to generate a next transmit sequence that is employed to communicate with a second wireless node that derives a next received sequence that corresponds to the next transmit sequence to process a subsequent communication.

23 Claims, 4 Drawing Sheets

Related U.S. Application Data continuation of application No. 17/035,891, filed on Sep. 29, 2020, now Pat. No. 11,456,772, which is a continuation of application No. 15/718,745, filed on Sep. 28, 2017, now Pat. No. 10,812,135.

(60) Provisional application No. 62/465,633, filed on Mar. 1, 2017, provisional application No. 62/464,976, filed on Feb. 28, 2017.

(51) Int. Cl.

| | |
|---|---|
| *H04L 9/06* | (2006.01) |
| *H04L 9/40* | (2022.01) |
| *H04W 12/037* | (2021.01) |
| *H04W 12/0471* | (2021.01) |
| *H04B 1/713* | (2011.01) |

(52) U.S. Cl.
CPC ........ *H04L 63/061* (2013.01); *H04L 63/0823* (2013.01); *H04W 12/037* (2021.01); *H04W 12/0471* (2021.01); *H04B 1/713* (2013.01)

(58) Field of Classification Search
USPC .......................................................... 375/132
See application file for complete search history.

(56) References Cited

U.S. PATENT DOCUMENTS

| | | | |
|---|---|---|---|
| 7,885,405 | B1 | 2/2011 | Bong |
| 9,804,988 | B1 | 10/2017 | Ayoub |
| 2002/0122462 | A1 | 9/2002 | Batra |
| 2003/0039250 | A1 | 2/2003 | Nichols |
| 2004/0103205 | A1 | 5/2004 | Larson |
| 2004/0225885 | A1 | 11/2004 | Grohoski |
| 2006/0143084 | A1 | 6/2006 | Donnelli |
| 2006/0222054 | A1 | 10/2006 | Conyers |
| 2007/0230460 | A1 | 10/2007 | Jeong |
| 2007/0242686 | A1 | 10/2007 | Zegers |
| 2007/0271830 | A1 | 11/2007 | Holt |
| 2009/0022073 | A1 | 1/2009 | Batra |
| 2009/0168846 | A1 | 7/2009 | Filippo, III |
| 2009/0204817 | A1 | 8/2009 | Deana-Roga |
| 2009/0303972 | A1 | 12/2009 | Flammer, III |
| 2010/0014564 | A1 | 1/2010 | Eskildsen |
| 2010/0111007 | A1 | 5/2010 | Suo |
| 2010/0138531 | A1 | 6/2010 | Kashyap |
| 2010/0202354 | A1 | 8/2010 | Ho |
| 2010/0278338 | A1 | 11/2010 | Chang |
| 2011/0149759 | A1 | 6/2011 | Jollota |
| 2012/0311345 | A1 | 12/2012 | Dhuse |
| 2013/0250928 | A1 | 9/2013 | Choi |
| 2014/0036751 | A1 | 2/2014 | Xhafa |
| 2014/0245453 | A1 | 8/2014 | Himawan |
| 2014/0355502 | A1 | 12/2014 | Xhafa |
| 2015/0038130 | A1 | 2/2015 | Mao |
| 2015/0245219 | A1 | 8/2015 | Wei |
| 2016/0164726 | A1* | 6/2016 | Fraser ................. H04L 41/0803 370/254 |
| 2016/0219024 | A1 | 7/2016 | Verzun |
| 2016/0262098 | A1* | 9/2016 | Vijayasankar ......... H04B 1/713 |
| 2017/0264600 | A1 | 9/2017 | Froelicher |
| 2017/0339133 | A1 | 11/2017 | Han |
| 2018/0116004 | A1 | 4/2018 | Britt |
| 2018/0248860 | A1 | 8/2018 | Xhafa |
| 2018/0376495 | A1 | 12/2018 | Lee |
| 2023/0130121 | A1 | 4/2023 | Peddada |

OTHER PUBLICATIONS

Institute of electrical and Electronics Engineers Std. 802.15.4-2015; Year 2015.

Institute of electrical and Electronics Engineers Std. 802.15.4-2015; Year 2015. Part 1B.

Institute of electrical and Electronics Engineers Std. 802.15.4-2015; Year 2015. Part 2.

Internet Engineering Task Force request for Comments 7383 (Smyslov); Year: 2014.

Part 15.4: Low Rate Wireless Personal Area Networks (LR-WPANs), Amendment 1: MAC sublayer, IEEE Std. 802.15.4e.2012 (Amendment to IEEE Std. 802.15.4-2011), Apr. 16, 2012, 225 pages.

* cited by examiner

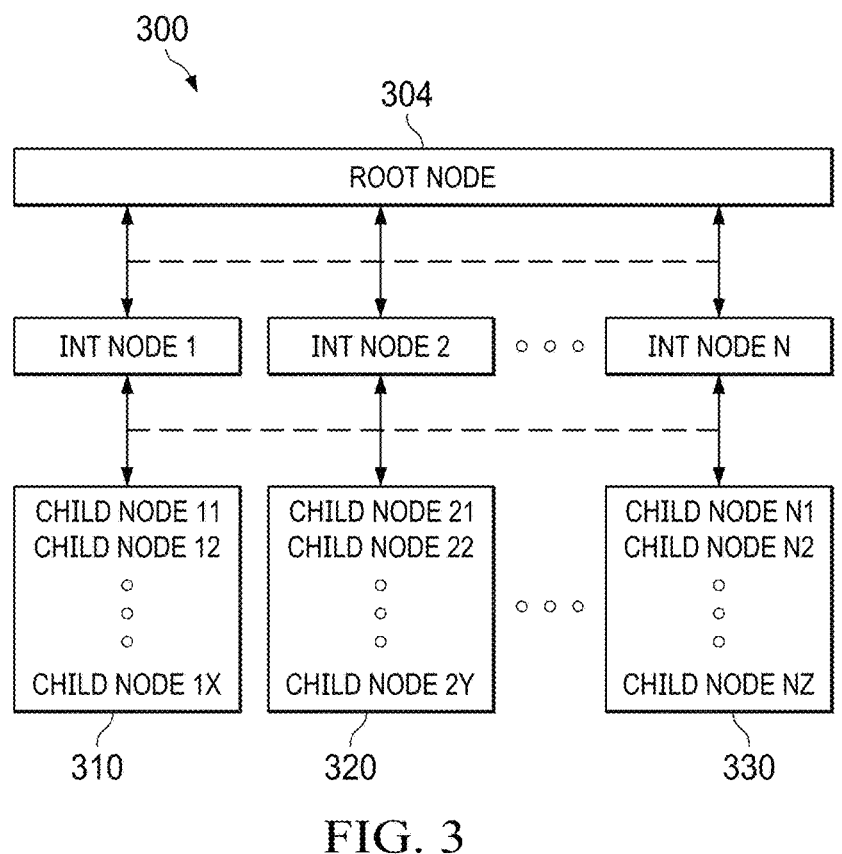
FIG. 3
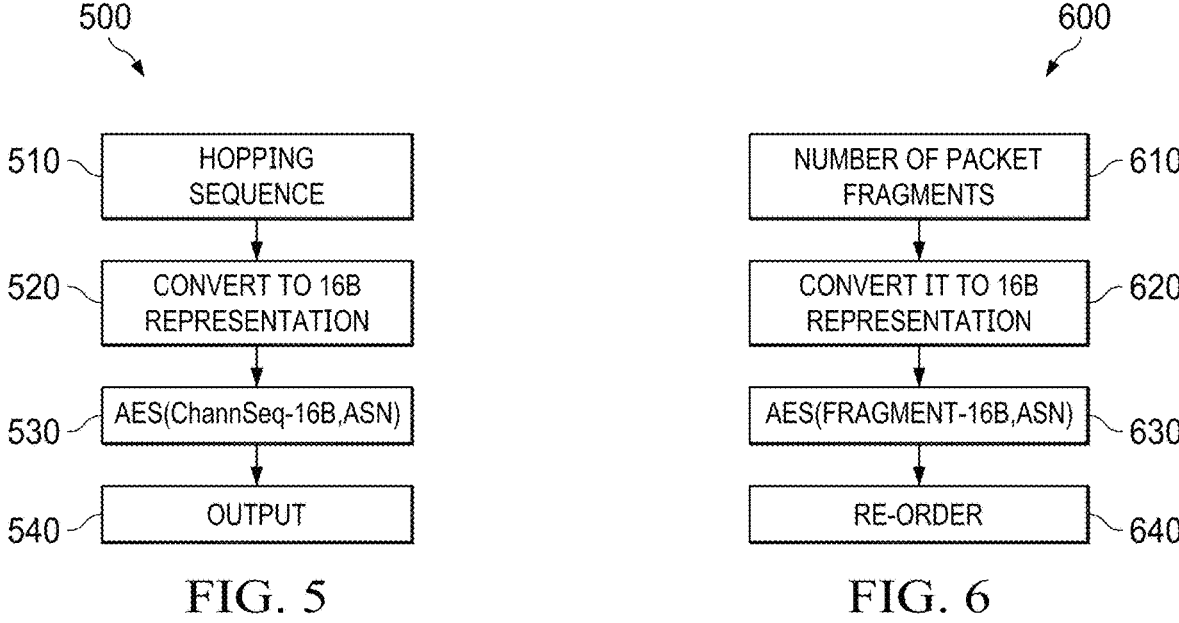
FIG. 5                    FIG. 6

INDEPENDENT SEQUENCE PROCESSING TO FACILITATE SECURITY BETWEEN NODES IN WIRELESS NETWORKS

CROSS-REFERENCE TO RELATED APPLICATION

This application is a continuation of U.S. patent application Ser. No. 17/952,551 filed Sep. 26, 2022, which is a continuation of U.S. patent application Ser. No. 17/035,891 filed Sep. 29, 2020, now U.S. Pat. No. 11,456,772, which is a continuation of U.S. patent application Ser. No. 15/718,745 filed Sep. 28, 2017, now U.S. Pat. No. 10,812,135, which claims priority to U.S. Provisional Patent Application No. 62/465,633, filed Mar. 1, 2017, and U.S. Provisional Patent Application No. 62/464,976 filed Feb. 28, 2017.

filed Sep. 29, 2020, which is a continuation of U.S. patent application Ser. No. 15/718,745, filed Sep. 28, 2017, now U.S. Pat. No. 10,812,135, which claims the benefit of U.S. Provisional Patent Application No. 62/464,976, filed on Feb. 28, 2017, and U.S. Provisional Patent Application No. 62/465,633, filed on Mar. 1, 2017, each of which is incorporated by reference herein in its entirety.

TECHNICAL FIELD

This disclosure relates to networks, and more particularly to independent sequence processing to facilitate security between nodes in wireless networks.

BACKGROUND

In channel hopping technologies data exchange between a pair of device is performed over different channels/frequency bands at different instances of time. This enables the network to improve performance by exploiting frequency diversity of the channel, address interference, and to some extent-improve network security. The latter is due to that it becomes more difficult for an adversary to gain complete information of a given communication between entities by listening to specific channels. Regardless of the channel hopping technology used, data exchange between a pair of nodes can be made more secure if the channel hopping sequence is also unknown to an adversary. Earlier approaches have suggested to encrypt the channel hopping sequence and transmit it to the device that the node is being paired. However, an adversary can receive the encrypted channel hopping sequence message and may also be able to observe the used channels, which can aid in mounting future attacks on the encryption schemes employed.

SUMMARY

This disclosure relates to independent sequence processing to facilitate security between nodes in wireless networks. In one example, a network includes a first wireless node that communicates over a wireless network connection. The first wireless node includes a first encryption engine that processes a first initialization data set and a current transmit sequence associated with a current communication to generate a next transmit sequence that is employed to communicate with a second wireless node that derives a next received sequence that corresponds to the next transmit sequence to process a subsequent communication.

In another example, a network includes a first wireless node and a second wireless node that communicates with the first wireless node over a wireless network connection. The first wireless node includes a first encryption engine that processes a first initialization data set and a current transmit channel hopping sequence associated with a current communication to generate a next transmit channel hopping sequence that is employed to communicate with the second wireless node on a subsequent communication. The second wireless node includes a second encryption engine that processes a second initialization data set and a current received channel hopping sequence corresponding to the current transmit channel hopping sequence from the first wireless node. The second encryption engine derives a next received channel hopping sequence that corresponds to the next transmit channel hopping sequence based on the second initialization data set and the current received channel hopping sequence to process the subsequent communication. The first wireless node generates a given message via the next transmit channel hopping sequence as a number of message packet fragments communicated between the first wireless node and the second wireless node. The first wireless node reorders the message packet fragments of the given message based on the number of message packet fragments in the given message and the first initialization data set provided to the first encryption engine. The second wireless node derives the ordering of the message packet fragments based off the second initialization data set and the number of message packet fragments processed by the second encryption engine.

In yet another example, a method includes receiving a current receive sequence and an initialization data set at a wireless node. The method includes processing the initialization data set and the current received sequence at the wireless node via an encryption engine to derive a next received sequence that corresponds to a next transmit sequence generated by at least one other wireless node to communicate with the wireless node.

BRIEF DESCRIPTION OF THE DRAWINGS

FIG. 3 illustrates an example network configuration having multiple intermediate and child nodes that can communicate with a root node utilizing sequence processing.

FIG. 5 illustrates an example method where channel hopping sequences are processed to facilitate network security between nodes of the network.

FIG. 6 illustrates an example method where messaged fragment numbers are processed to facilitate network security between nodes of the network.

DETAILED DESCRIPTION

This disclosure relates to independent sequence processing to facilitate security between nodes in wireless networks.

The sequence processing can include processing channel hopping sequences and/or message fragment numbers that are independently processed by separate encryption engines to facilitate security between nodes of the wireless network. In one example, the network includes a first wireless node and a second wireless node that communicate over a wireless network connection. The first wireless node includes a first encryption engine that processes a first initialization data set and a current transmit sequence associated with a current communication to generate a next transmit sequence that is employed to communicate with the second wireless node on a subsequent communication. For example, the current transmit sequence can include a current channel hopping sequence and/or a number of message fragments to be transmitted. The second wireless node includes a second encryption engine that independently processes a second initialization data set and a current received sequence corresponding to the current transmit sequence from the first wireless node. The second encryption engine derives a next received sequence that corresponds to the next transmit sequence based on the second initialization data set and the current received sequence to process the subsequent communication.

Since the next transmit sequence and the next received sequence is not communicated over the wireless network connection from the first wireless node to the second wireless node, it can be derived by the second wireless node utilizing the initialization data and the current received sequence that corresponds to the current transmit sequence. By deriving a next received sequence that corresponds to the next transmit sequence rather than transmitting and receiving it over the wireless connection, channel hopping sequences and/or message fragment ordering cannot be discovered as with previous methods.

The first and second initialization data sets can include an encryption key and/or an initialization vector, for example, where the encryption key can be pre-stored on each wireless module or exchanged via secure data exchangers. In another example, the first wireless node generates a given message according to the next transmit sequence (e.g., via the next channel hopping sequence) as a number of message packet fragments communicated between the first wireless node and the second wireless node. The first wireless node reorders the message packet fragments of the given message based on the number of message packet fragments in the given message and the first initialization data set provided to the first encryption engine. The second wireless node derives the ordering of the message packet fragments based off the second initialization data set and the number of message packet fragments processed by the second encryption engine.

Figure 1:
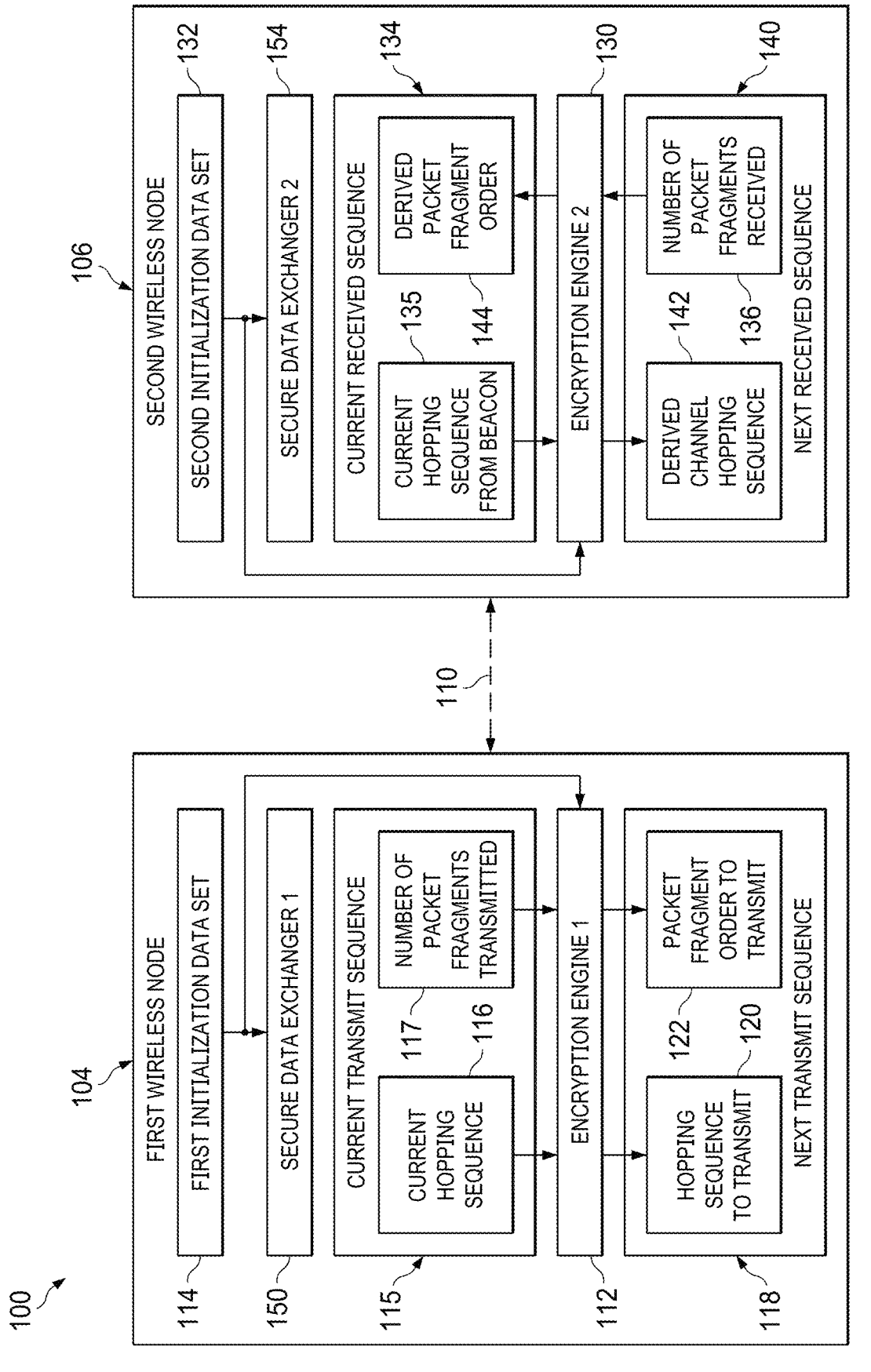
FIG. 1 illustrates an example network where sequences are processed to facilitate network security between nodes of the network.

FIG. 1 illustrates an example network 100 where numerical sequences are processed to facilitate network security between nodes of the network. The network 100 includes a first wireless node 104 and a second wireless node 106 to communicate with the first wireless node over a wireless network connection 110. The first wireless node 104 includes a first encryption engine 112 that processes a first initialization data set 114 and a current transmit sequence 115 associated with a current communication to generate a next transmit sequence 118 that is employed to communicate with the second wireless node 106 on a subsequent communication. The current transmit sequence 115 can include a current channel hopping sequence 116 and/or a number of packet fragments transmitted at 117. The next transmit sequence 118 includes the next channel hopping sequence to transmit 120 and a packet fragment order to transmit at 122.

The second wireless node 106 includes a second encryption engine 130 that processes a second initialization data set 132 and a current received sequence 134 corresponding to the current transmit sequence 115 from the first wireless node 104.

The second encryption engine 130 derives a next received sequence 140 that corresponds to the next transmit sequence 118 based on the second initialization data set 132 and the current received sequence 134 to process the subsequent communication. The current received sequence 134 can include a current hopping sequence 135 which can be encrypted and received via a beacon sent from the first wireless node 104. The current received sequence 134 can also include the number of message packet fragments received at 136.

The first and second initialization data sets 114/132 can include an encryption key and an initialization vector that includes an absolute slot number, for example, of the first or second wireless node 104 and 106, respectively. The encryption key can be stored on each of the first wireless node 104 and the second wireless node 106 (e.g., as initialization data) before communications begin over the wireless network connection 110. In another example, the first wireless node 104 includes a first secure data exchanger 150 and the second wireless node 106 includes a second secure data exchanger 154 to exchange the encryption key between the first wireless node and the second wireless node over the wireless network connection 110. The encryption key can be exchanged between the first and second secure data exchangers 150 and 154 utilizing a public key infrastructure (PKI) exchange, a certificate exchange to verify parameters of the PKI exchange, and/or a timer setting to facilitate that PKI exchange has occurred before a predetermined time period has elapsed before exchanging the encryption key.

The next transmit sequence 118 includes the next channel hopping sequence 120 that can be configured according to a frequency hopping spread spectrum (FHSS) protocol, a time synchronized channel hopping (TSCH) protocol, or an unslotted channel hopping (USCH) protocol, for example. If the length of the channel next hopping sequence 120/142 is N and there are M channels being used to communicate between the first and second wireless nodes 104 and 106, then the highest number of N from the next transmit sequence 118 and the next received sequence 140 can be assigned to the highest channel M and the succeeding lower numbers of N in the next transmit sequence and the next received sequence can be consecutively assigned in descending order to channel numbers less than M, with N and M being a positive integer and M is equal to N. Other assignments are also possible.

If the length of the channel hopping sequence 120/142 N is larger than M and there are M channels being used to communicate between the first and second wireless nodes 104 and 106, the next transmit sequence 118 or the next received sequence 140 can be divided into groups of M that are then assigned as previously described when M equals N. In rare instances, if two or more numbers of the next transmit 118 or the next received sequence 140 are the same but not consecutive in the respective sequence, then each of the M channels can be assigned to the N channel hopping sequences in the order from highest to lowest. If two or more numbers of the next transmit sequence 118 or the next received sequence 140 are the same and consecutive in the respective sequence, then the first of the same numbers can be assigned to the lowest channel number and succeeding of the same numbers can be assigned to the next higher channel numbers in ascending order.

If two or more groups of numbers of the next transmit sequence 118 or the next received sequence 140 are the same, then the first of the same numbers of the group can be assigned to the lowest channel number and succeeding of the same numbers of the group can be assigned to the next higher channel numbers in ascending order if the groups are not consecutive. If the groups are consecutive, then an alternating pattern of assigning the remaining lowest number of the consecutive group to the remaining highest channel of the consecutive group until all numbers have been assigned to the respective channels.

The number of message packet fragments that were sent in a given message can be reordered without transmitting the reordering between the first wireless node 104 and the second wireless node 106. The first wireless node 104 reorders message packet fragments of the given message based on the number of message packet fragments in the given message and the first initialization data set 114 provided to the first encryption engine 112. The second wireless node 106 derives the ordering of the message packet fragments at 144 of the given message based off the second initialization data set 132 and the number of message packet fragments processed at 136 by the second encryption engine 134. In one example, the last message packet fragment of the given message indicates a last fragment packet such that the second wireless node 106 can compute the number of message packet fragments in the given message.

In another example, the number of message packet fragments can be communicated over the wireless network connection 110. The first and second encryption engines 112 and 130 respectively can be advanced encryption standard (AES) engines in one example but other encryption methods are possible. The wireless nodes 104 can communicate via various wireless protocols over the wireless network connection 110. The wireless network protocol described herein can be any time division multiple access protocol (TDMA), such as a time slotted channel hopping (TSCH) protocol specified according to IEEE 801.15.4e, for example.

Figures 2, 4:
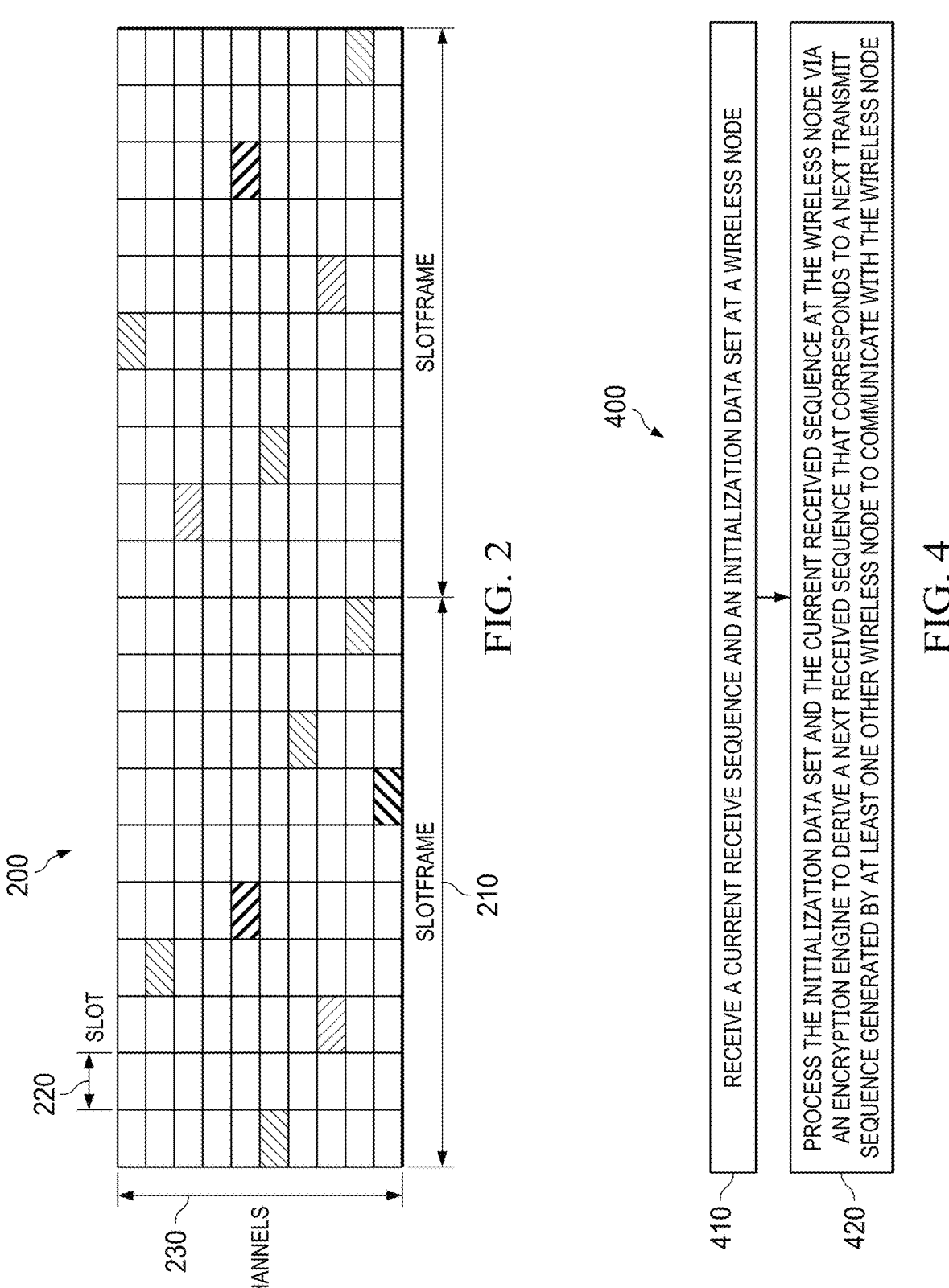
FIG. 2 illustrates an example of a network protocol for sequence processing and time synchronization that utilizes channels, slot frames and time slots.
FIG. 4 illustrates an example method where sequences are processed to facilitate network security between nodes of the network.

FIG. 2 illustrates an example of a network protocol diagram 200 for node processing and time synchronization that utilizes channels, slot frames and time slots. As used herein, the term "time slot" refers to a designated period of time in a communications frame where a given node can receive and/or transmit data, where a slot frame is a basic unit set of contiguous time-slots transmitted according to a schedule that repeats over time. Some time slots in the frame are reserved for beacon communications and some time slots are shared meaning that any node can transmit data during a shared time slot. Shared time slots are also referred to as contention slots since multiple nodes can conflict with each other if each node transmits data during the shared slot. Other time slots are specifically reserved as receive time slots and transmit time slots for each respective node. As described herein, in some examples, child nodes can be assigned a lower slot number in the slot frame to allow the child node to synchronize to the intermediate node before the intermediate node synchronizes to its respective parent node.

The diagram 200 illustrates the mode of operation for a time slotted channel hopping (TSCH) media access control (MAC) although other protocols are possible. Time consists of a slot frame 210, where each slot frame consists of timeslots (or slots) 220. Timeslots can be dedicated for use to a given network node in some examples or be utilized as shard time slots for communications in other examples.

The communication between the nodes in the network occurs during the timeslots 220, although, it can happen across the same or different channels shown at 230. The channels are utilized to account for modulo differences between frames. For example, if a child node communicates on slot two in frame one of a ten slot frame, in the next frame it would communicate on the second slot of the fame which would be twelve slots from the beginning of the first frame. Thus, in the second frame, the child node could communicate on channel three during the second time slot of frame two. For example, if node A and node B are assigned slot 3 in slot frame 1, the channel that they are communicating in this slot frame is channel 3. However, in slot frame 2, the timeslot number is the same; however, the channel number is 5 this time. As noted above, each node computes its own start time for the beginning of the slot frame and where it expects each nodes corresponding slot time in the frame to occur. When nodes are out of time synchronization, the computed time by each node for the beginning of the slot frame 210 differs between nodes. The timing correction/synchronization information can be exchanged (e.g., sent from parent node to network node) or computed (e.g., network node computes base on response in an acknowledgement packet and timing of a received beacon or data frame from the parent node).

As described previously, the current channel hopping sequence being used can be transmitted in the beacon. For instance, the root node can decide which channel hopping sequence to use based on the output of linear shift feedback registers (LSFR). If the default channel hopping sequence is used (e.g., the seed of LSFR is set to 255), the root node or other intermediate nodes does not transmit the channel hopping sequence, rather it indicates that the sequence one is used. In case a different channel hopping sequence that does not use LSFR is used, the whole hopping sequence can be transmitted. However, if LSFR is used, the seed of LSFR can be transmitted. The current hopping sequence, encryption engines, and initialization data as described herein can be utilized to generate and derive new sequences without transmitting the new sequences over the wireless network as with previous systems and methods.

FIG. 3 illustrates an example network configuration 300 having multiple intermediate and child nodes where a root node communicates with a plurality of network nodes. Each of the intermediate and child nodes shown in the network configuration 300 can include respective encryption engines and/or secure data exchangers as described herein. A top level in the network 300 can include a root node 304 which serves as a parent node to one or more intermediate nodes shown as INT NODE 1 through INT NODE N, where N is a positive integer. Thus, each of the intermediate nodes can be viewed as a child node of the parent nodes. In turn, each of the intermediate nodes 1 though N can have one or more child nodes attached thereto. For example, at 310, child nodes 11 through 1X can report to intermediate node 1 operating as a parent node, where X is a positive integer. At 320, child nodes 21 through 2Y can report to intermediate node 2 operating as a parent node, where Y is a positive integer. At 330, child nodes N1 through NZ can report to intermediate node N operating as a parent node, where Z is a positive integer.

A dashed line is shown between nodes at the intermediate level and another dashed line is shown between nodes at the child level, where each dashed line represents that some nodes may be able to communicate between other members at a common hierarchy level and some nodes may not be able to communicate at the common level. In some network examples, intermediate nodes and/or child nodes may communicate with other nodes at their respective hierarchy levels depending on network topologies and network device locations. In other examples, communications can be routed to and/or from the respective child nodes, through the intermediate nodes, to the root node 304 in order to route messages from one node in the network to another node in the network that is not in the same linear path as the respective root node, intermediate node, and child node. In some examples, the node hierarchy can depend on the physical location and proximity among the nodes in the network (e.g., a centrally located node being a root or intermediate node and edge nodes being child nodes). Additionally or alternatively, node hierarchy can be determined according to the temporal order in which nodes are added to the network (e.g., first node being a root node and last added node being a child node).

The network 300 can be provided as a multi-hop wireless network that consists of the root node 304, intermediate nodes, and child nodes. The root node 304 connects the network to an internal or external network. The intermediate nodes connect the child nodes (and other intermediate nodes) to the root node and from there via the root node to the internal/external network. The definition of child nodes, in this example, is that there are no other nodes connected to these nodes. To transmit data in these networks, the nodes can then use the link information, which can be communication parameters (e.g., specified channel and network time), to communicate and send data to their neighboring nodes. In order to use the link information are to be synchronized and receive beacons. Intermediate nodes also transmit beacons and in these beacons, the same information that was sent by the coordinator is repeated. This is to allow other intermediate and child nodes to connect to and communicate within the network.

In view of the foregoing structural and functional features described above, example methods will be better appreciated with reference to FIGS. 4, 5, and 6. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured as machine readable instructions stored in memory and executable in an IC or a processor, for example.

FIG. 4 illustrates an example method where sequences are processed to facilitate network security between nodes of the network. At 410, the method 400 includes receiving a current receive sequence and an initialization data set at a wireless node (e.g., via second wireless node 106 and encryption engine 130 of FIG. 1). At 420, the method 400 includes processing the initialization data set and the current received sequence at the wireless node via an encryption engine to derive a next received sequence that corresponds to a next transmit sequence generated by at least one other wireless node to communicate with the wireless node (e.g., via received numerical sequence 134 at second wireless node 106 of FIG. 1). The next transmit sequence and the next received sequence can be a channel hopping sequence or a number of packet fragments in a given message. The channel hopping sequence can be configured for a frequency hopping spread spectrum (FHSS) protocol, a time synchronized channel hopping (TSCH) protocol, or an un-slotted channel hopping (USCH) protocol, for example.

FIG. 5 illustrates an example method 500 where channel hopping sequences are processed to facilitate network security between nodes of the network. The method 500 can be executed by the first wireless node to generate the hopping sequence 120 of the next transmit sequence 118. The method 500 can also be used by the second wireless node 106 to generate the next the derived channel hopping sequence 142 of the next received sequence 140. As shown, the method 500 processes a current channel hopping sequence at 510. At 520, the hopping sequence is converted to advanced encryption standard (AES) 16 byte format (e.g., four rows and four columns of bytes). At 530, the formatted data of 520 is processed via an AES engine which processes the 16 byte format for the hopping sequence along with other data such as an initialization vector (e.g., absolute slot number). At 540, a next hooping sequence from the current channel hopping sequence is generated if the method 500 is executed on the first wireless node. If the method 500 is executed on the second wireless node, then the output at 540 relates to the derived channel hopping sequence.

In previous methods, a typical method to exchange secure data was to use existing secure key exchange techniques and transmit the channel hopping sequence as a part of the message. An adversary however, could retrieve the "used channel hopping sequence". This known information such as the hopping channels and the ciphered text intercepted during the message exchange can be used to obtain the encryption key. The systems and methods described herein mitigate the security problems associated with transmission of encrypted channel hopping sequence by not transmitting the channel hopping sequence over the air—except for the current sequence transmitted in the beacon. Instead, a new channel hopping sequence can be derived from the existing sequence. To achieve this, the channel hopping sequence can be passed through the AES engine (or other encryption engine), using initialization data for example such as an encryption key and the absolute slot number (ASN) where the output is used to derive a new hopping sequence such as shown in the method 500.

The manner in which to derive the new hopping sequence from the output can be achieved as follows. If the length of the channel hopping sequence is 16 and there are 16 channels being used, for example, then, the highest number of the output can be assigned to channel 16, the second highest to channel 15 and so on. If the length of the channel hopping sequence is larger than 16 and there are 16 channels being used, the output is split in groups of 16 and the above approach can be followed as well. Since AES outputs are unlikely to be the same, the method 500 can operate without issues if duplicate numbers are generated in the output at 540. In the case that two or more outputs numbers are the same, there are a few conditions to consider. If the outputs are not consecutive, then assign to channels in the order from highest to lowest. If only two output numbers are the same and consecutive, the first number can be assigned to the lowest channel number and the second to the highest channel, and the procedure for the other channels continues as described above. If there are multiple groups of the same two output numbers and if groups are not consecutive, the procedure is as above for each group. If groups are consecutive, then order is determined by selecting the lowest number first, then highest, then second lowest, then second highest, and so on. To illustrate this consider the following. Assume channels 16 and 15 have already been assigned and the next 4 numbers are the highest but the same and thus channels 14, 13, 12, and 11 have yet to be assigned. Then, the order is 11, 14, 12, 13 in this example. In this manner, an adversary will not be able to guess or receive information out of the channel hopping sequence. Note that for the initialization data/vector, the pair of nodes could exchange this information during their initial handshake and any other information to facilitate device configuration.

FIG. 6 illustrates an example method 600 where messaged fragment numbers are processed to facilitate network security between nodes of the network. The method 600 can be executed by the first wireless node to generate the packet fragment order 122 of the next sequence 118. The method 600 can also be used by the second wireless node 106 to generate the derived packet fragment order 144 of the next received sequence 140. As shown, the method 600 processes the number of message packet fragments at 610. At 620, the message fragment number is converted to advanced encryption standard (AES) 16 byte format (e.g., four rows and four columns of bytes). At 630, the formatted data of 620 is processed via an AES engine which processes the 16 byte format for the fragment number along with other data such as an initialization vector (e.g., absolute slot number). At 640, a next transmit sequence (e.g., new message fragment ordering) from the message fragment number is generated if the method 600 is executed on the first wireless node. If the method 600 is executed on the second wireless node, then the output at 640 relates to the derived message fragment order of the next received sequence 140.

In earlier approaches, scrambling message packet fragments has been attempted as a method to secure the ordering of fragmented packets over the air. However, scrambling methods need to be disclosed at both the wireless transmitter and the receiver before it is used. The methods describe herein utilize message scrambling for fragmented packets, however the order of the fragmented packets is passed through the AES engine, using initialization data for example such as the absolute slot number (ASN) where the output from the AES is used to derive the new order such as shown in the method of FIG. 6. Each fragment can be transmitted in the new order as derived from the AES engine. The manner in which to derive the re-ordering from the output can be achieved as follows. Each sequence number that depicts the number of fragments for the packet to be transmitted is passed through the AES engine. For example, if there are 4 total fragments for the packet, then sequence (1,2,3,4) is passed through the AES engine.

The output is then re-ordered based on the numerical output from the AES engine. For example, if the sequence outputted 251, 128, 980, 10 respectively for fragment numbers 1, 2, 3, and 4. Then the order is mapped/derived as 3, 2, 4, and 1 respectively. Note that the sequence number transmitted over the air in plain text is still 1, 2, 3, 4, however, with 1 now representing 3, 2 representing 2, 4 representing 3, and 1 representing 4. Thus, there is no information on the encryption key being transmitted. Rather, the negotiated encryption key between the device pair is used to generate the output, together with some initial vector, such as the ASN, for example. In this manner, there is no need for a predefined scrambling sequence exchanged between the nodes. In addition, even if the adversary knows the order, it does not know what the output of the AES engine was in order to use brute force to compute the key. At the receiver end, the last transmitted fragment will have indication that this is the end of packet. Based on the number of the fragments received, the receiver then will calculate the order and map each received fragment to their own respective fragment. To increase the security of fragmented packet, the number of fragments should be about 35, at which, it will have the same complexity as an AES-128 encryption.

Figure 7:
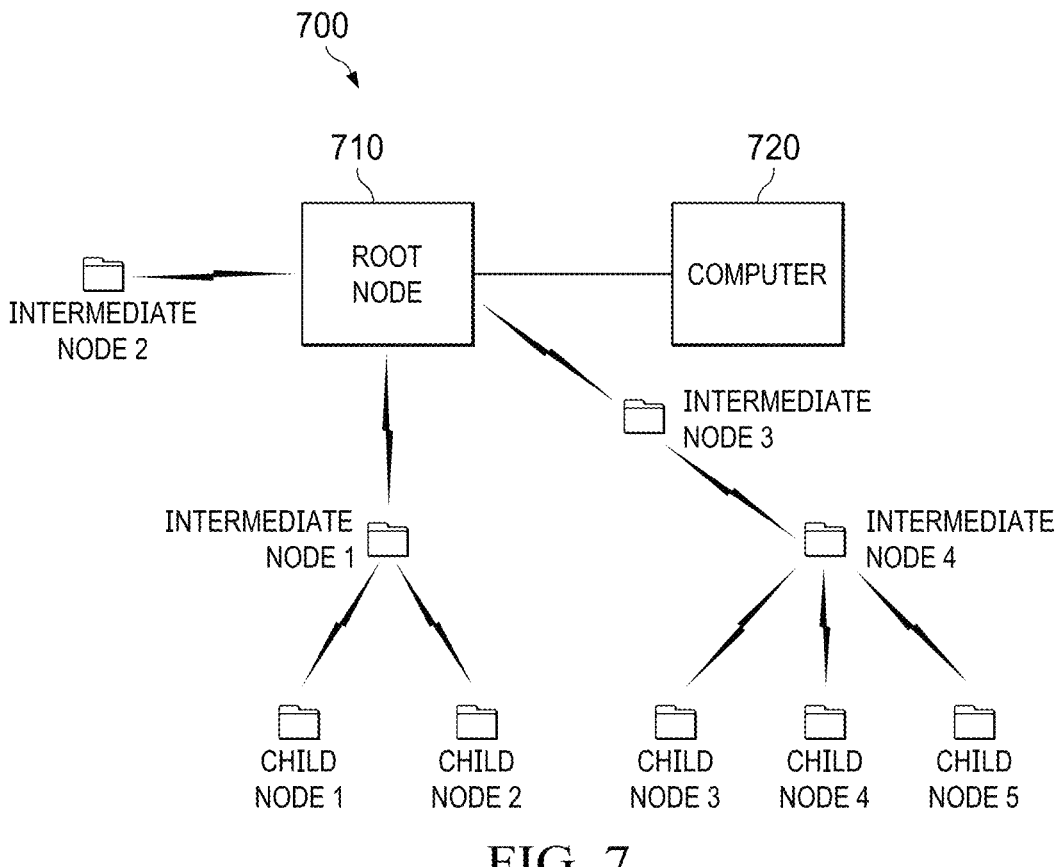
FIG. 7 illustrates an example system where sequences are processed to facilitate network security between nodes of the network.

FIG. 7 illustrates an example system 700 where a network node establishes communications with other network nodes of the system. As shown, the system 700 can include a root node 710 that can be configured via a network computer 720 (e.g., laptop, cell phone). The root node 710 communicates directly to intermediate nodes 1 though 3 and indirectly through node 3 to intermediate node 4 that in turn communicates with child nodes 3, 4, and 5. As shown, intermediate node 1 communicates with two child nodes 1 and 2.

Figure 8:
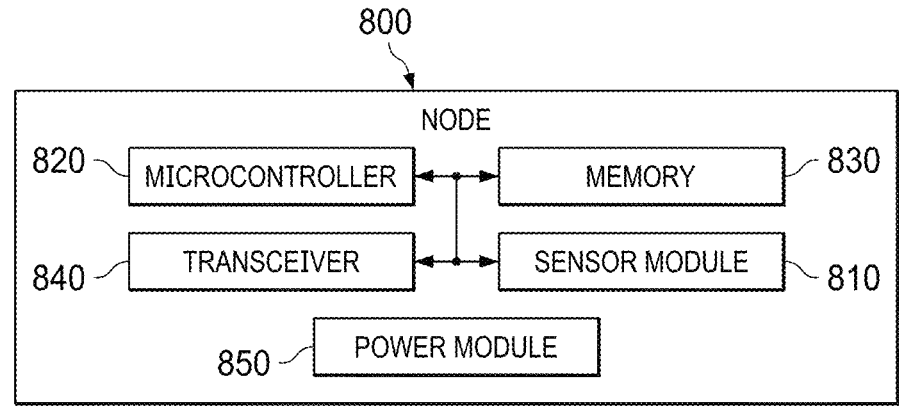
FIG. 8 illustrates an example node that can be employed in a network where sequences are processed to facilitate network security between nodes of the network.

FIG. 8 illustrates an example node 800 that can be employed in a network where numerical sequences are processed to facilitate network security between nodes of the network. The example node 800 can be employed as part of a wireless sensor network (WSN) or system that contains a plurality (even hundreds of thousands) of sensor nodes. Such network/system examples where the node 800 can be implemented are shown with respect to FIGS. 1 and 3. Each node 800 can be equipped with a sensor module 810 to detect physical phenomena such as light, heat, pressure, and so forth. The sensor nodes in the WSN can communicate among themselves via radio signals utilizing substantially any wireless protocol such as Bluetooth, Bluetooth Low energy (BLE), WIFI, IEEE 802.11, and Worldwide Interoperability for Microwave Access (WiMAX) protocol, Long Term Evolution (LTE), for example. The individual nodes in the WSN are inherently resource constrained, thus they tend to be limited in processing speed, storage capacity, and communication bandwidth. After the sensor nodes are deployed, they are responsible for self-organizing an appropriate network infrastructure often with multi-hop communication with them. The working mode of the sensor nodes may be either continuous or event driven for example.

Wireless sensor networks are spatially distributed autonomous sensors to monitor physical or environmental conditions, such as temperature, sound, pressure, and so forth and to cooperatively pass their data through the network to a main location. The more modern networks are bi-directional, also enabling control of sensor activity. The WSN is built of "nodes," where each node 800 is connected to one (or sometimes several) sensors. The WSN's can include ad-hoc networks where nodes can connect and leave the network dynamically. The node 800 generally includes a microcontroller 820, memory 830 (e.g., ferroelectric random access memory (FRAM)), wireless transceiver 840 (e.g., Texas Instrument CC2500 2.4 GHz RF transceiver), power module 850 (e.g., Texas Instrument BQ25504), along with the sensor module 810 (e.g., temperature detector, infrared detector, input/output module, analog conversion module). Intermediate nodes and child nodes generally share the same hardware and software but change their status (intermediate/ child) depending if they are configured per a given communications layer operating with the node memory 830 and/or transceiver 840 such as a routing layer or a network layer, for example. A root node may have one additional level of capability over the intermediate/child nodes which is the ability to connect to other larger/broader networks such as the Internet.

Size and cost constraints on sensor nodes result in corresponding constraints on resources such as energy, memory, computational speed, and communications bandwidth. The topology of the WSNs can vary from a simple star network to an advanced multi-hop wireless mesh network. The propagation technique between the hops of the network can be routing or flooding. Software is typically reduced in complexity to conserve power on respective sensor nodes. Examples of node operating software systems can include TI-RTOS, TinyOS, LiteOS, and Contiki, for example. Other sensor nodes may operate as embedded systems without the use of a given operating system. The node synchronization capabilities described herein can be executed by the microcontroller 820 as executable instructions operating within the memory 830. In an alternative example, the microcontroller 820, memory, transceiver 840, and/or sensor module 810, can be implemented as an application specific integrated circuit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An electronic device comprising:
a transceiver;
a memory configured to store an encryption key; and
a controller configured to:
   determine, based on the encryption key and on a first sequence for communicating via the transceiver, a second sequence for communicating via the transceiver, and
   transmit, via the transceiver, a message according to the second sequence.

2. The electronic device of claim 1, wherein the first sequence is a first hopping sequence, wherein the second sequence is a second hopping sequence, and wherein transmitting the message comprises transmitting the message based on the second hopping sequence.

3. The electronic device of claim 2, wherein transmitting the message based on the second hopping sequence comprises transmitting the message in accordance with a frequency hopping spread spectrum (FHSS) protocol.

4. The electronic device of claim 2, wherein transmitting the message based on the second hopping sequence comprises transmitting the message in accordance with a time synchronized channel hopping (TSCH) protocol.

5. The electronic device of claim 2, wherein transmitting the message based on the second hopping sequence comprises transmitting the message in accordance with an un-slotted channel hopping (USCH) protocol.

6. The electronic device of claim 1, wherein the controller is configured to determine the second sequence using an encryption engine.

7. The electronic device of claim 6, wherein the encryption engine is an advanced encryption standard (AES) engine.

8. The electronic device of claim 6, wherein, to determine the second sequence using the encryption engine, the controller is configured to use an absolute slot number.

9. The electronic device of claim 1, wherein transmitting the message comprises transmitting the message in a multi-hop wireless network.

10. The electronic device of claim 1, wherein, to determine the second sequence, the controller is configured to:
   convert the first sequence to advanced encryption standard (AES) format to generate formatted data;

process the formatted data using an AES engine to generate an AES output; and
   determine the second sequence based on the AES output.

11. The electronic device of claim 10, wherein converting the first sequence to AES format comprises converting the first sequence to AES 16 byte format.

12. The electronic device of claim 1, wherein the controller is configured to transmit, via the transceiver, the first sequence is a beacon frame.

13. The electronic device of claim 1, wherein the first sequence is a first message fragmentation order, wherein the second sequence is a second message fragmentation order, and wherein transmitting the message comprises transmitting the message using the second message fragmentation order.

14. The electronic device of claim 1, wherein the controller is configured to exchange, via the transceiver, the encryption key with a wireless device.

15. The electronic device of claim 1, further comprising a sensor.

16. An electronic device comprising:
a transceiver;
a memory configured to store an encryption key; and
a controller configured to:
   determine, based on the encryption key and on a first sequence for communicating via the transceiver, a second sequence for communicating via the transceiver, and
   receive, via the transceiver, a message according to the second sequence.

17. The electronic device of claim 16, wherein the first sequence is a first hopping sequence, wherein the second sequence is a second hopping sequence, and wherein receiving the message comprises receiving the message according to the second hopping sequence.

18. The electronic device of claim 17, wherein receiving the message comprises receiving the message in accordance with a frequency hopping spread spectrum (FHSS) protocol, a time synchronized channel hopping (TSCH) protocol, or an un-slotted channel hopping (USCH) protocol.

19. The electronic device of claim 16, wherein the first sequence is a first message fragmentation order, wherein the second sequence is a second message fragmentation order, and wherein receiving the message comprises receiving the message according the second message fragmentation order.

20. The electronic device of claim 16, wherein the controller is configured to receive, via the transceiver, the first sequence is a beacon frame.

21. The electronic device of claim 16, wherein the controller is configured to determine the second sequence using an encryption engine.

22. The electronic device of claim 21, wherein the encryption engine is an advanced encryption standard (AES) engine.

23. The electronic device of claim 16, wherein, to determine the second sequence, the controller is configured to:
   convert the first sequence to advanced encryption standard (AES) format to generate formatted data;
   process the formatted data using an AES engine to generate an AES output; and
   determine the second sequence based on the AES output.

* * * * *